United States Patent [19]

Rhodes

[11] Patent Number: 4,770,285

[45] Date of Patent: Sep. 13, 1988

[54] CONVEYOR DEVICE HAVING A ROTATABLE PALLET AND DEVICE FOR ROTATING A PALLET

[76] Inventor: Arthur B. Rhodes, 3347 Camp Ground Rd., Louisville, Ky. 40211

[21] Appl. No.: 85,370

[22] Filed: Aug. 14, 1987

[51] Int. Cl.⁴ .............................................. B65G 47/24
[52] U.S. Cl. ........................... 198/378; 198/474.1; 198/802; 269/61
[58] Field of Search ............... 198/344, 377, 378, 802, 198/474.1, 476.1, 477.1, 365; 269/61

[56] References Cited

U.S. PATENT DOCUMENTS

| | | | |
|---|---|---|---|
| 2,775,333 | 12/1956 | Hayes | 198/344 |
| 2,931,276 | 4/1960 | Zerlin | 198/474.1 X |
| 3,785,853 | 1/1974 | Kirkman et al. | 198/344 X |
| 3,938,653 | 2/1976 | Senger | 198/344 |
| 4,370,925 | 2/1983 | Kazumi et al. | 198/802 |

Primary Examiner—Robert J. Spar
Assistant Examiner—Cheryl L. Gastineau
Attorney, Agent, or Firm—Charles G. Lamb

[57] ABSTRACT

A conveyor device for transferring a workpiece along a conveyor path between work stations located at various positions along the conveyor path includes a pallet for supporting a workpiece which is rotatable and a pallet drive device located at selected work stations along the conveyor path. The pallet drive device is drivingly connectable to the pallet positioned at that work station to rotate the pallet so as to present various portions of the workpiece supported on the pallet to an inspection or manufacturing process.

7 Claims, 2 Drawing Sheets

4,770,285

CONVEYOR DEVICE HAVING A ROTATABLE PALLET AND DEVICE FOR ROTATING A PALLET

BACKGROUND OF THE INVENTION

The present invention relates to material handling conveyor systems, and more particularly to a pallet for conveying an article along a conveyor path and turning the article carried thereon at various work stations positioned there along.

Various rotatable pallets and workpiece fixtures are known.

For example, U.S. Pat. No. 2,775,333 teaches a pallet which is guided along a path defined by casters affixed to a guide rail. The pallet is pulled along the guide rail by a chain. Gates or movable channel sections are located next to the guide rails to engage the edge of the pallet as it moves therepast. As the gates are pivoted, they cause the pallets to rotate as the pallets are moving along the path.

It is also known from U.S. Pat. No. 3,785,853 to have a moving plate conveyor upon which a workpiece rests with two endless workpiece contact belt systems located opposite each other to opposite longitudinal sides of the moving plate conveyor so that the endless belts contact opposite sides of the workpiece as the workpiece passes therebetween on the plate conveyor. The endless belts are operated at different linear speeds so as to turn the workpiece passing therebetween.

In U.S. Pat. No. 3,938,653 it is known to have a workpiece carrying pallet which is moved along a conveying path and is caused to rotate as it advances or moves there along. The conveyor includes a center endless belt which has upwardly projecting pins which are received in a centered aperture in the bottom of the pallet. Two spaced apart drive belts run parallel to the endless belt on either side of a center belt and functionally contact the bottom side of the pallet to move the pallet along the conveyor path. One drive belt is driven at a higher linear speed than the other drive belt which causes the pallet to rotate about the pin of the center endless belt as the pallet is moved along the conveyor path.

SUMMARY OF THE INVENTION

It is an object of the present invention to provide a rotatable pallet and a device for rotating a pallet which is not limited in its application to any particularly configured or shaped workpiece.

It is another object of the present invention to provide a rotatable pallet and device for rotating a pallet which can be used with various types of conveyor systems.

It is yet another object of the present invention to provide a rotatable pallet and device for rotating a pallet which can rotate in either rotational direction, that is clock-wise or counter clock-wise, which can rotate through at least one complete revolution, which is reversibly rotatable, and which can index through a portion of a complete revolution in either or both rotational directions as the demands of the process to be performed on the workpiece being carried on the pallet may require.

More particularly, the present invention provides in one embodiment a device for selectively rotating a pallet movable along a conveyor path comprising a driven axle attached to the pallet and depending therefrom, a driven chain sprocket coaxially attached to the driven axle for rotation therewith, chain guide roller means adjacent the chain sprocket having the axis of rotation parallel to the axis of rotation of the driven chain sprocket, a device chain trained about the chain sprocket and chain guide roller means, a drive sprocket separate from the pallet and located next to the pallet having the axis of rotation generally parallel to the axis of rotation of the driven sprocket; means for rotatably driving the driven sprocket, and means for selectively moving the drive sprocket into and out of engagement with the drive chain such that when the drive sprocket is in engagement with the drive chain, the pallet is driven by the drive chain in a rotational direction about the axis of the driven axle.

Another embodiment of the present invention provides a conveyor device for transferring a workpiece along a conveyor path between work stations located at various positions along the conveyor path comprising a carriage movable along the conveyor path, a pallet on the carriage for supporting a workpiece to be conveyed, a driven axle attached to the pallet and depending therefrom and journalled to the carriage, a driven chain sprocket coaxially attached to the driven axle for rotation therewith, chain guide sprocket means on the carriage adjacent the driven chain sprocket having the axis of rotation parallel to the axis of rotation of the driven chain sprocket, a drive chain trained about the chain sprocket and chain guide sprocket means, a drive sprocket located next to the conveyor path having the axis of rotation generally parallel to the axis of rotation of the driven sprocket means for rotatably driving the drive sprocket, and means for selectively moving the drive sprocket into and out of engagement with the drive chain such that when the drive sprocket is in engagement with the drive chain the pallet is driven by the drive chain in a rotational direction about the axis of the driven axle.

BRIEF DESCRIPTION OF THE DRAWINGS

A better understanding of the invention will be had upon reference to the following description in conjunction with the accompanying drawings wherein.

DETAILED DESCRIPTION OF THE PREFERRED EMBODIMENT

Figure 1:
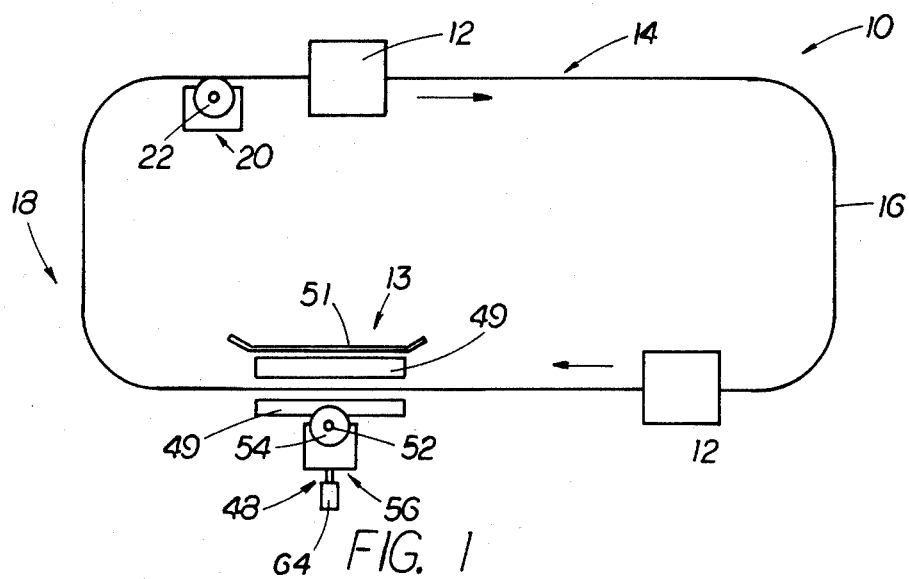
FIG. 1 is a plan view of a conveyor system employing the present invention.

With reference to FIG. 1, for the sake of illustration, there is shown a conveyor system, generally denoted as the numeral 10, for moving load bearing conveyor devices 12 along a conveyor path 14. Such conveyor systems are generally known, and have particular application in, for example, manufacturing for moving workpieces through various work stations 13 along the conveyor path 14. As shown, the conveyor system 10 comprises an endless conveyor chain 16 which moves along the floor 18 of a facility defining the conveyor path 14 through which the load bearing conveyor devices 12 will move. The conveyor chain 16 is caused to move by chain drive means 20, such as an electric motor drivingly associated with the chain 16 by, for example, a chain drive sprocket 22. For the sake of brevity and clearness of understanding of the invention, the conveyor system 10 will not be further described because suitable conveyor systems are well known in the art and do not, per se, constitute a part of the present invention.

Figure 2:
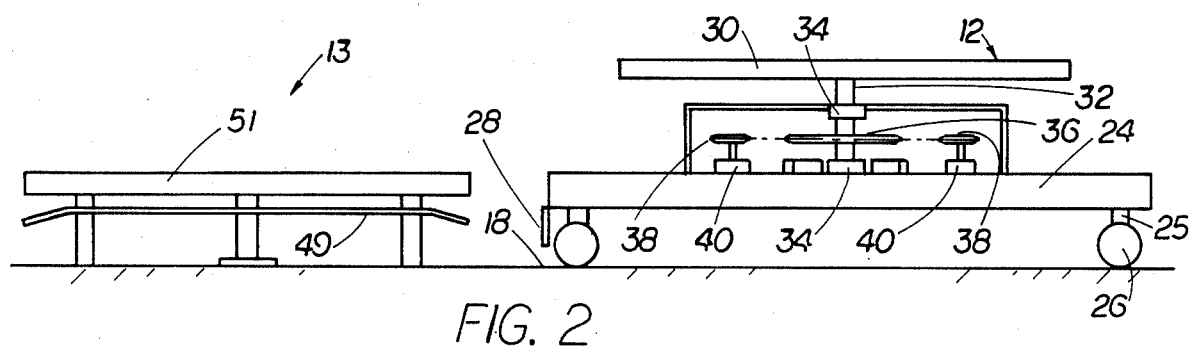
FIG. 2 is an enlarged side view of a conveyor device embodying the present invention.
Figure 3:
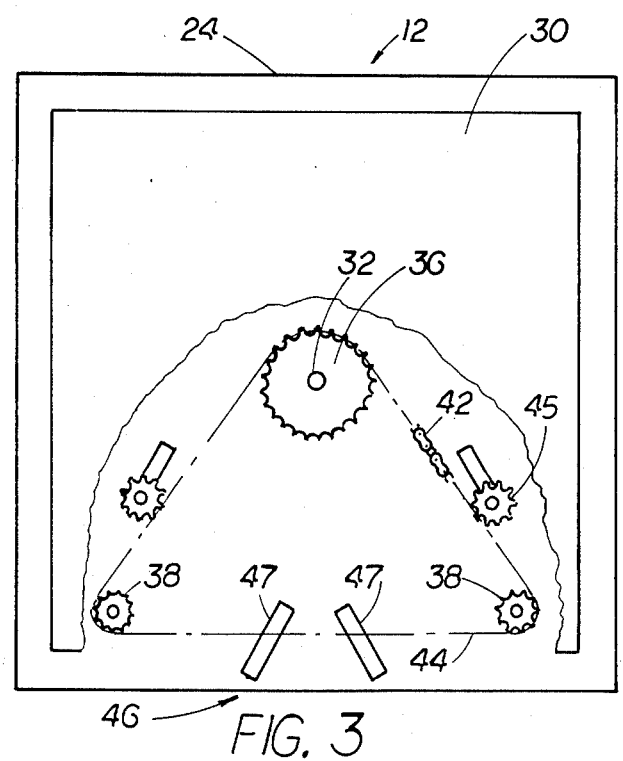
FIG. 3 is a plan view of the conveyor device of FIG. 1 with portions broken away to more clearly show details of one component of the present invention.

Now with reference to FIGS. 2 and 3, there is shown a load bearing conveyor device 12 employing the present invention. As shown, the load bearing conveyor device 12 comprises a carriage 24 having a frame structure 25 and floor engaging wheels 26 rotatably attached to the frame structure 25. The frame structure can be of virtually any construction and configuration to support a load to be carried thereon. The carriage 24 includes a conveyor chain engagement means 28 for selectively coupling and uncoupling the carriage 24 to the conveyor chain 16. Again, for the sake of brevity and clearness of understanding of the invention, the chain engagement means 28 will not be further described for the reason that various types of conveyor chain engagement means are well known in the art, can be used with the carriage 24, and does not, per se, constitute a part of the present invention. The load bearing conveyor device 12 further includes a workpiece support shown as a flat pallet 30 positioned at the top of the carriage 24. A driven axle 32 is affixed to the underside of the pallet 30 and depends therefrom. The driven axle 30 is journal mounted to the carriage 24 by bearings 34. A driven chain sprocket 36 is coaxially attached to the driven axle 32 beneath the pallet 30 for rotation with the driven axle that is so that when the driven sprocket 36 is rotated, the driven axle 32 rotates with the driven sprocket 36, and the pallet 30 rotates with the driven axle 32. As shown, two chain guide sprockets 38 are mounted to the carriage 24 by bearings 40 adjacent the driven chain sprocket 36. In addition, the chain guide sprockets 38 are coplanar with the driven chain sprocket 36. A pallet drive chain 42 is trained about the driven chain sprocket 36 and the chain guide sprockets 38. Preferably, the flight 44 of the drive chain 42 extending between the chain guide sprockets 38 is located near one side of the carriage 24 and is generally in line with the direction of movement of the conveyor device 12 along the conveyor path, that is in general parallel alignment with the conveyor chain 16. Pallet drive chain tensioning rollers 45 can engage the drive chain 42 to maintain a proper tension on the drive chain 42 to prevent inadvertent disengagement of the drive chain 42 from the driven sprocket 36 and guide sprockets 38. Carriage locating means 46 is located on the carriage 24 beneath the drive chain flight 44 centered between the chain guide sprockets 38. The locating means 46 is shown as a pair of flanges 47 oriented in a V-configuration with the opening at the convergent end of the configuration adjacent to the one side of the carriage 24 at which the drive chain flight 44 is located.

With reference to FIGS. 1 and 2, the work station 13 is comprised of conveyor device ramp means illustrated as two ramps 49 parallel to and spaced to opposite lateral sides of the conveyor path 14. As shown, the upstream end of the ramps 49 are inclined to a horizontal section and the downstream end of the ramps 49 are declined from the horizontal section. The horizontal section of each of the ramps 49 is elevated above the facility floor 18 by an amount just sufficient to relieve or support a portion of the weight of the load bearing conveyor device 12 but with the floor engaging wheels 26 of the carriage 24 still in contact with the facility floor 18. The work station 13 also comprises a horizontal conveyor device contact bar 51 spaced to one lateral side of the conveyor path 14 and from one of the ramps 49 and parallel to the ramps 49. The horizontal contact bar 51 is spaced from the conveyor path 14 by a distance sufficient to be clear of initial contact with the carriage 24 of the load bearing conveyor device 12 and is spaced above the facility floor 18 by a distance corresponding to the elevation of the carriage 24 of the load bearing conveyor device 12. The work station 13 further comprises a pallet chain driving means 48 located next to the conveyor path 14 to the opposite lateral side thereof from the horizontal contact bar 51.

Figure 4:
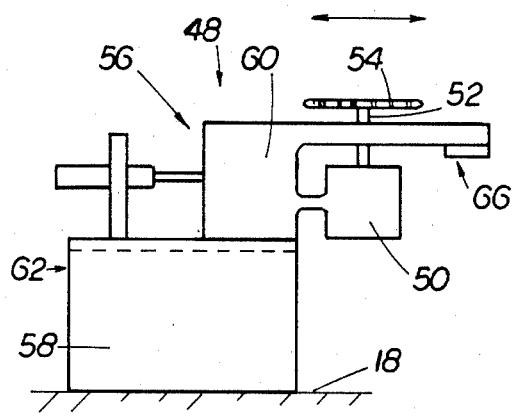
FIG. 4 is a side view of another component of the present invention.
Figure 5:
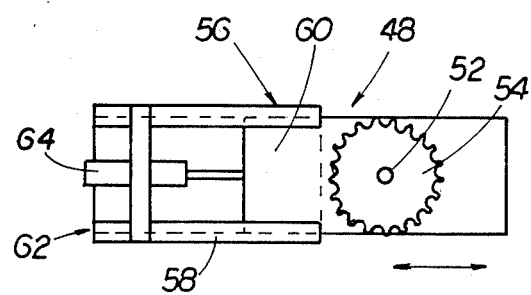
FIG. 5 is a plan view of the component of FIG. 4.
Figure 7:
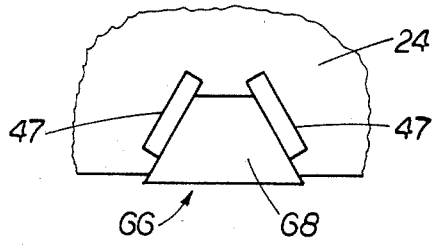
Figure 6:
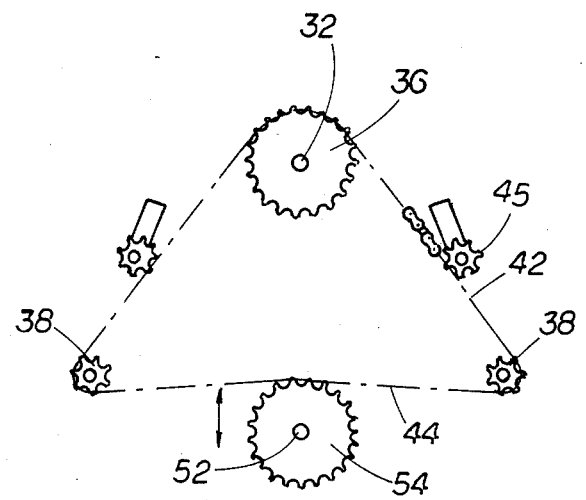
FIG. 6 is a schematic representation of one component of the invention associated with the conveyor device of FIG. 2 and the other component of the present invention of FIG. 5; and, FIG. 7 is a schematic representation of yet other mating components of the invention.

Now with reference to FIGS. 1, 4 and 5, there is shown means for driving the pallet drive chain 48. The pallet chain driving means 48 is located next to the conveyor path 14 at a work station 13 for engaging and disengaging the pallet drive chain 42 when a conveyor device 12 is at the proper position adjacent the pallet chain driving means 48. The pallet chain driving means 48 comprises a motor 50 having its output shaft 52 oriented vertically or in parallel with the axis of rotation of the chain guide sprockets 38. A drive sprocket 54 is coaxially affixed to the motor output shaft 52 for rotation therewith. The drive sprocket 54 is coplanar with the driven chain sprocket 36, and chain guide sprockets 38, and therefore, also coplanar with the drive chain flight 44 of the pallet drive chain 42. The motor 50 is mounted to a movable fixture 56 which is affixed to the facility floor 18 next to the conveyor chain 16. The movable fixture 56 is movable toward and away from the conveyor chain 16 and, therefore, the conveyor device 12 as indicated by the double headed arrows in FIGS. 4, 5 and 6. The movable fixture 56 is shown as comprising a stationary base 58 attached to the facility floor 18 and a slide 60 movably attached to the base 58. The base 58 and slide 60 can be movably interconnected by, for example, a dove-tail connection 62. The motor 50 is attached to the slide 60 for movement therewith. The slide 60 is caused to move toward and away from the conveyor chain 16 and, therefore, a conveyor device 12 by actuator means such as, for example, a pneumatic or hydraulic cylinder device 64 which has the cylinder affixed to the stationary base 58 and the operating rod attached to the slide 60. As the operating rod of the cylinder device 64 extends the slide 60 is moved toward the conveyor chain 16 and as the operating rod retracts the slide 60 is moved away from the conveyor chain 16. With reference to FIG. 4, the movable fixture 56 further comprises means 66 for locating the carriage means 46 when the movable fixture 56 is moved toward the conveyor chain 16. The carriage locating means 66 is shown as including a wedge shaped cam 68 configured to be received in th V-configuration defined by the flanges 47 through the open convergent end thereof. In operation of the conveyor system 10, the load bearing devices 12 are pulled along the conveyor path 14 by engagement of the carriage engagement means 28 with the conveyor chain 16 to a work station 13. As a load bearing device 12 enters a work station 13 the load bearing device carriage 24 contacts the ramps 49 and is supported thereon relieving some of the load from the wheels 26 of the load bearing device 12 and properly locating the load bearing device 12 in a vertical position above the facility floor. Referring to FIG. 7, with the load bearing device 12 thusly positioned on the ramps 49, the movable mixture 56 is moved to its position toward the conveyor chain 16 and conveyor device 12, such that the cam 68 is received between the flanges 47 and making contact therewith. The coaction of the cam 68 and flanges 47 pushes the conveyor device 12 toward and against the horizontal contact bar 51 thusly properly positioning the conveyor device 12 transversely of the conveyor chain 16, and also properly locates the conveyor device 12 at the workstation 13 in the longitudinal direction of the conveyor chain 16. The coaction of the cam 68 and flanges 47 also positions the carriage 24 in proper alignment with the movable fixture 56 so that the drive sprocket 54 engages the pallet drive chain flight 44. As shown, the cam 68 is attached to and depends from the underside of the slide 60. Referring to FIG. 7, with the movable fixture 56 moved to its position toward the conveyor chain 16 and conveyor device 12, when the motor 50 is energized, the output shaft 52 rotates causing the drive sprocket 54 to rotate. The drive sprocket 54 being in engagement with the pallet drive chain 42 causes the drive chain 42 to translate thus rotating the driven chain sprocket 36. As the driven chain sprocket 36 rotates, the pallet 30 rotates with the driven chain sprocket 36. After the pallet 30 is rotated as required, the motor 50 is de-activated and the movable fixture 56 is moved in a direction away from the conveyor chain 16 disengaging the drive sprocket 54 from the pallet drive chain 42 so that the conveyor device 12 can resume movement with the conveyor chain 16 along the conveyor path 14.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A device for selectively rotating a pallet comprising:
    a driven axle attached to the pallet and depending therefrom;
    a driven chain sprocket coaxially attached to the axle for rotation therewith;
    chain guide roller means adjacent to the chain sprocket having the axis of rotation parallel to the axis of rotation of the driven chain sprocket;
    a drive chain trained about the chain sprocket and chain guide roller means;
    a drive sprocket separate from the pallet having the axis of rotation of the driven sprocket;
    means for rotatably driving the drive sprocket; and,
    means for selectively moving the drive sprocket into and out of engagement with the drive chain such that when the drive sprocket is in engagement with the drive chain the pallet is driven by the drive chain in a rotational direction about the axis of the driven axle.

2. The device of claim 1, further comprising means for locating the pallet at the drive sprocket.

3. A conveyor device for transferring workpieces along a conveyor path between work stations located at various positions along the conveyor path comprising:
    a carriage moveable along the conveyor path;
    a workpiece support on the carriage for supporting a workpiece to be conveyed;
    a driven axle attached to the workpiece support and depending therefrom and journal mounted to the carriage;
    a driven chain sprocket coaxially attached to the driven axle for rotation therewith;
    chain guide sprocket means on the carriage adjacent the driven chain sprocket having the axis of rotation parallel to the axis of rotation of the driven chain sprocket;
    a drive chain trained about the chain sprocket and chain guide sprocket means;
    a drive sprocket located next to the conveyor path having the axis of rotation generally parallel to the axis of rotation of the driven sprocket;
    means for rotatably driving the drive sprocket;
    means for selectively moving the drive sprocket into and out of engagement with the drive chain such that when the drive sprocket is in engagement with the drive chain the workpiece support is driven by the drive chain in a rotational direction about the axis of the driven axis.

4. The conveyor device of claim 3, further comprising means for locating the carriage at the position of the drive sprocket.

5. The conveyor device of claim 3, further comprising means for locating the conveyor device transversely of the conveyor path at a work station.

6. The conveyor device of claim 3, further comprising means for locating the conveyor device in a vertical position of the conveyor path at a work station.

7. The conveyor device of claim 3, further comprising means for locating the conveyor device at the work station in the longitudinal direction of the conveyor path.

* * * * *